(12) United States Patent
Senn

(10) Patent No.: US 8,550,803 B2
(45) Date of Patent: Oct. 8, 2013

(54) METHOD AND DEVICE FOR INSTALLING AND/OR DEINSTALLING BLOW MOULDS

(75) Inventor: Konrad Senn, Regensburg (DE)

(73) Assignee: Krones AG, Neutraubling (DE)

(*) Notice: Subject to any disclaimer, the term of this patent is extended or adjusted under 35 U.S.C. 154(b) by 288 days.

(21) Appl. No.: 12/871,196

(22) Filed: Aug. 30, 2010

(65) Prior Publication Data

US 2011/0049742 A1  Mar. 3, 2011

(30) Foreign Application Priority Data

Sep. 2, 2009 (DE) .......................... 10 2009 039 699

(51) Int. Cl.
*B29C 49/36* (2006.01)
*B29C 49/56* (2006.01)
*B29C 33/30* (2006.01)

(52) U.S. Cl.
USPC ......... 425/195; 29/401.1; 29/426.1; 425/526; 425/540; 425/541

(58) Field of Classification Search
USPC ............. 425/3, 182, 186, 195, 522, 540, 541, 425/526; 29/401.1, 426.1
See application file for complete search history.

(56) References Cited

U.S. PATENT DOCUMENTS

| 5,232,716 A * | 8/1993 | Seto et al. ..................... 425/185 |
| 6,851,944 B2 | 2/2005 | Effenberger |
| 8,038,429 B2 | 10/2011 | Linke et al. |
| 2004/0202745 A1 | 10/2004 | Tsau et al. |
| 2007/0269545 A1 * | 11/2007 | Ellis et al. .......................... 425/3 |
| 2009/0136613 A1 | 5/2009 | Linke et al. |
| 2009/0178264 A1 * | 7/2009 | Stoiber ......................... 29/401.1 |
| 2010/0104681 A1 | 4/2010 | Dagorn |

FOREIGN PATENT DOCUMENTS

| DE | 36 13 543 C1 | 12/1986 |
| DE | 3613543 C1 * | 12/1986 |
| DE | 250 495 A1 | 10/1987 |
| DE | 101 52 050 A1 | 5/2003 |
| DE | 10 2005 035 233 A1 | 4/2007 |
| FR | 2 903 932 A1 | 1/2008 |
| FR | 2 921 010 A1 | 3/2009 |
| WO | 2007/012308 A1 | 2/2007 |

OTHER PUBLICATIONS

Partial machine translation of DE3613543C1 dated Dec. 1986 obtained from the esp@cenet website.*
Search Report from European Patent Office for counterpart application EP 10 17 4587 (Jul. 5, 2011).
Search Report from German Patent Office for counterpart application DE 10 2009 039 699.3 (Sep. 9, 2011).

* cited by examiner

*Primary Examiner* — Robert B Davis
(74) *Attorney, Agent, or Firm* — Novak Druce Connolly Bove + Quigg LLP

(57) ABSTRACT

A method for operating a transforming device for transforming plastic preforms into plastic containers may include at least one blow mould carrier and a multi-part blow mould arranged on the blow mould carrier. A holding connection may be provided between the blow mould and the blow mould carrier. The holding connection between the blow mould carrier and the blow mould may be detached or established in an at least partially automated manner.

20 Claims, 4 Drawing Sheets

METHOD AND DEVICE FOR INSTALLING AND/OR DEINSTALLING BLOW MOULDS

CROSS-REFERENCE TO RELATED APPLICATION

This application claims the benefit of priority of German Patent Application No. 10 2009 039 699.3, filed Sep. 2, 2009, pursuant to 35 U.S.C. 119(a)-(d), the disclosure of which is incorporated herein by reference.

TECHNICAL FIELD

The present disclosure relates to a transforming device for transforming plastic preforms into plastic containers and also to a method for installing/deinstalling associated blow moulds.

BACKGROUND

Transforming devices, such as for example devices for transforming by blow moulding, which transform plastic preforms into plastic containers, have been known for a relatively long time in the prior art. To this end, such devices usually have so-called blow moulds which can be folded together and form in their interior a cavity which serves for expanding a plastic preform against the wall of the cavity in order thus to produce plastic containers.

These blow moulds therefore usually comprise two blow mould halves which are arranged in corresponding blow mould carriers.

If such a device is to be changed over to other types of bottle, it is necessary for the blow moulds to be removed from the blow mould carrier and to be replaced by other blow moulds. This procedure, which is carried out by hand, is relatively time-consuming since, particularly for a large number of blow moulding stations, each individual blow mould has to be removed from its carrier.

For this reason, various coupling mechanisms are known from the prior art which allow the quickest possible separation of the blow moulds from their mould carriers. Such quick-release mechanisms in some cases allow a very quick changeover of the respective blow moulds. Nevertheless, even quicker possibilities for such a blow mould changeover are being sought. In addition, the blow moulds are usually operated with temperature control media, e.g. for a neck cooling of the preforms of for a temperature control of the bottom mould. These supply lines for the temperature control media must also usually be manually separated and connected again.

It may therefore be desirable to develop a faster system and method for installing/deinstalling such blow moulds. It may also be desirable to carry out such blow mould changeovers in an automated manner.

SUMMARY OF INVENTION

According to various aspects of the disclosure, a method for operating a transforming device for transforming plastic preforms into plastic containers may comprise at least one blow mould carrier and a multi-part blow mould arranged on this blow mould carrier. Furthermore, a holding connection is provided between the blow mould and the blow mould carrier.

According to the disclosure, the holding connection between the blow mould carrier and the blow mould or a temperature control connection for controlling the temperature of the transforming device and in particular of the blow mould is detached (or separated) or established in an at least partially automated manner. For example, the holding connection between the blow mould carrier and the blow mould may be detached (or separated) or established in a fully automated manner.

The aforementioned temperature control connection may be a flow connection which supplies a temperature control medium to the blow mould, but the temperature control connection may also be for example an electrically conductive connection, by means of which electric heating or cooling elements (such as for example Peltier elements) are supplied with electrical energy in order to control the temperature of the blow mould.

In some aspects, the blow mould has at least one channel for guiding a temperature control medium for the blow mould, and also at least one connector which can be separated from the channel and which is provided for supplying the temperature control medium to the channel, wherein a flow connection between the connector and the channel is detached (or separated) or established in an at least partially automated manner.

In contrast to the prior art, therefore, it is proposed that the deinstallation of the blow mould may be carried out in an at least partially automated manner. Until now, such an automated deinstallation was not desirable since the individual components of the blow mould have always been removed manually and therefore an automation would not have brought any time advantage. Instead, such an automation might have led to a higher safety risk without any associated benefits.

It is possible that, during a deinstallation mode, both the holding connection between the blow mould and the blow mould carrier and also the flow connection are separated in an automated manner. However, it would also be possible that just one of these connections is separated or established automatically. Accordingly, it is also possible that, in the context of an installation mode, both the holding connection between the blow mould and the blow mould carrier and also the flow connection are established in an automated manner. However, it would also be possible that just one of these connections is established automatically.

By virtue of the automated removal or deinstallation, the corresponding changeover times can be reduced. The holding connection may be for example a mechanical holding connection which holds the blow mould on the blow mould carriers for example by form-fitting or force-fitting means in the working mode. However, the holding connection between the blow mould or the blow mould parts and the blow mould carrier or the blow mould carrier parts may also be a magnetic connection or the like.

In various aspects, the blow mould is separated from the blow mould carrier in an at least partially assembled state, said blow mould carrier preferably being of multi-part construction. A partially assembled state of the blow mould is understood here to mean that the individual components of the blow mould and in particular the side parts of the blow mould and optionally also the bottom part are removed from the blow mould carrier in a defined physical relationship to one another and in particular are not removed independently of one another. By virtue of this procedure, the automatic installation and/or deinstallation of the blow mould can be considerably simplified.

It is pointed out that the method according to the disclosure can also be applied accordingly to the installation of blow moulds by connecting a blow mould in an at least partially assembled state to the blow mould carrier.

By virtue of the procedure according to the disclosure, it is also possible to use an opening process of the blow mould carrier in order to remove the blow mould from the carriers, said opening process also being necessary in the working mode of the device. In some exemplary methods, the blow mould is separated from the blow mould carrier in a first method step and then the blow mould is removed from the transforming device in an at least partially assembled state.

In some exemplary embodiments, the blow mould comprises a bottom part and this bottom part may be attached to at least one blow mould half while the blow mould is being separated from the blow mould carrier. In some aspects, the two blow mould halves have recesses which receive the bottom part and clamp it for example between them. It is thus possible that the bottom part is arranged on both blow mould halves and in particular is suspended in both blow mould halves.

In some exemplary methods, the blow mould halves are locked onto the bottom part in such a way that the mould carrier detaches from the blow mould halves during the opening of said mould carrier. For instance, it may be provided that, in a special installation or deinstallation mode of the transforming device, firstly a lock between the mould carrier and the blow mould is opened and then the mould carriers are opened and finally the blow mould is removed.

In some exemplary methods, the separation or establishment of the holding connection between the blow mould carrier and the blow mould or the separation or establishment of the flow connection between the connector and the channel is brought about by a movement of the blow mould carrier. This is preferably a movement along a circular path.

This means that, for the deinstallation and/or installation, use is made of a movement of the blow mould carrier and in particular of a transport movement, i.e. in particular use is not made of an opening or closing movement of the blow mould carrier, and in particular use is made of such a movement which exists with regard to its movement direction also in the context of a working mode. For example, it is possible that a plurality of blow moulding stations comprising blow mould carriers are transported on a blow moulding wheel and this transport movement on the blow moulding wheel is also used in an installation and/or deinstallation mode.

This movement of the blow mould carrier, which leads to the detachment or establishment of the above connections, may be a continuous movement. It is thus proposed here that the deinstallation or installation is also carried out during continuous operation. For instance, it is possible that a blow moulding wheel, on which a plurality of blow moulding stations are arranged, is moved or rotated continuously in order to carry out the deinstallation or installation of the blow moulds or the separation and establishment of the flow connections.

For instance, subsequent to a working mode of the machine, the blow moulding wheel could continue to be rotated continuously in a deinstallation mode and thus the blow mould carriers are moved in a continuous movement relative to one or more guide cams.

In some exemplary methods, the separation or establishment of the holding connection between the blow mould carrier and the blow mould and the separation or establishment of the flow connection between the connector and the channel are brought about in a common operating process. In this way, the efficiency of the deinstallation or installation process can be further increased. For example, the separation of the holding connection and the separation of the flow connection can be brought about substantially at the same time and/or by the same movement of the blow mould carrier.

In addition, it would also be possible that said operating processes are carried out using the same guide cam.

In some exemplary methods, a first guide device is used at least to separate or to establish the holding connection or the flow connection between the channel and the connector. This guide device may be for example a guide cam, relative to which the blow moulds and/or the blow moulding wheel are movably arranged. By virtue of the relative movement of the mould carrier relative to stationary cams, both the mould and also all the water connectors can be detached and fixed in a cam-controlled manner. However, guide cams need not necessarily be used as the guide devices; it would also be conceivable that a lever which is mounted on the mould carrier, is moved via a stationary (but optionally also movable) stop bolt is moved.

In some exemplary methods, the guide cam is moved in order to separate the holding connection or in order to separate the connector from the channel (more specifically in order to initiate this process, i.e. at the start of an installation or deinstallation mode). For example, it is possible that the guide cam is moved towards the machine or the blow moulding wheel in order to carry out an installation or deinstallation mode.

The fixing or establishment of the connection may advantageously take place via a cam which can be moved forwards for the changeover mode and which is not in engagement during normal operation. The forward movement may take place by hand or automatically (e.g. pneumatically, electrically, hydraulically or magnetically). In some aspects, it is ensured via a safety check that no normal operation can take place with the cam in the moved-forward position. The fixing may take place directly using the cam or also using movable levers or displaceable cams. In a corresponding manner, a displacement may also take place in a deinstallation mode, i.e. during the detachment of the holding connection and/or of the flow connection.

In some exemplary embodiments, the blow mould comprises a bottom part, and at least one connector for a temperature control medium is connected to the bottom part or separated from the bottom part in an automated manner. It would also be possible that channels for temperature control media are provided both in the side parts of the blow mould and also in the bottom part.

The blow mould halves may be advantageously designed in a manner symmetrical to one another. It is also possible that the blow mould halves serve to jointly hold a further mother mould, inside which the plastic preforms are expanded to form the plastic containers.

The present disclosure also relates to a transforming device for transforming plastic preforms into plastic containers. The transforming device may comprise a multi-part blow mould which forms a cavity, inside which the plastic preforms can be expanded to form plastic containers. The transforming device may comprise a blow mould carrier on which the blow mould is detachably arranged via a holding connection, and wherein the blow mould may have at least one channel for guiding a temperature control medium. The transforming device may comprise at least one connector which can be separated from the channel and which is provided for supplying the temperature control medium to the channel.

According to the disclosure, the transforming device comprises at least one coupling device for at least partially separating or establishing a holding connection between the blow mould carrier and the blow mould or for at least partially separating or establishing a flow connection between the connector and the channel.

In some exemplary embodiments, the blow mould carrier is connected to the blow mould via a—for example, automatically—releasable connection mechanism. In some aspects, therefore, this connection mechanism in the case of a deinstallation is first released in order then (in particular after the opening of the blow mould carrier) to remove the blow mould. In the case of installation, the blow mould may be advantageously first inserted between the blow mould carriers and then the releasable connection mechanism is locked in order to arrange the two blow mould halves in the mould carrier.

In some exemplary embodiments, two parts of the blow mould, in particular during installation or deinstallation from the blow mould carrier, are directly attached to one another by a holding means.

In some aspects, the coupling device comprises at least a first guide device, relative to which the blow mould carrier is movably arranged. As mentioned above, this guide device may be a guide cam but also a bolt which moves for example a lever on the blow mould carrier.

According to various aspects, the guide device is movable. While such guide devices such as guide cams are arranged in a stationary manner in the prior art, it is proposed here that the guide device is movable in order in particular to be moved forwards in an installation or deinstallation mode.

In some aspects, the coupling device comprises a second guide device, relative to which the blow mould carrier is movably arranged. The first guide device could thus be used for deinstallation of the blow mould and the second guide device could be used for installation of the blow mould. A plurality of guide devices could also be provided, which are used for example for separating the holding connection, for separating the flow connection, for establishing the holding connection and for establishing the flow connection.

According to various aspects, the first guide device serves for at least partially separating the holding connection between the blow mould carrier and the blow mould and/or for at least partially separating a flow connection between the connector and the channel, and the second guide device serves for at least partially establishing the holding connection between the blow mould carrier and the blow mould and/or for at least partially establishing the flow connection between the connector and the channel.

In some aspects, a holding means is provided between the blow mould and the blow mould carrier, which holding means holds the blow mould on the blow mould carrier in a working mode, wherein this holding means is movable in a radial direction. By virtue of this radial movement of the holding means or of part of this holding means, the holding connection between the blow mould carrier and the blow mould or parts thereof can, according to some aspects, be separated or established.

According to various aspects, the connector is movable in a longitudinal direction of the blow mould. In this way, for example, the flow connection for supplying the temperature control medium can be separated or established. In some aspects, a valve device is provided which suppresses any further flow of media after a separation of the flow connection between the connector and the channel. There may thus be provided for example in the connector a valve which closes as soon as the connector is separated.

Some further advantages and embodiments may become evident from the attached drawings.

DETAILED DESCRIPTION

Figure 1:
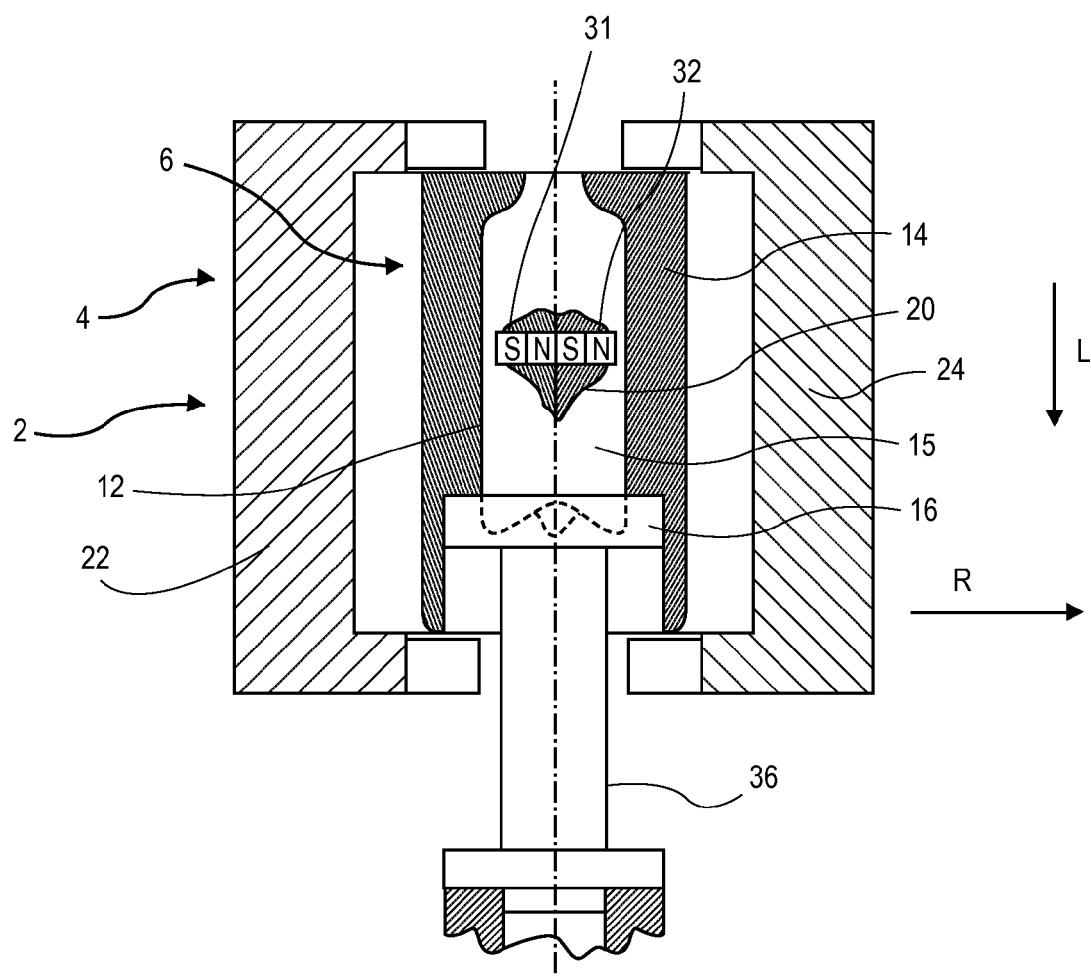
FIG. 1 shows a schematic diagram of a blow mould carrier with a blow mould.

FIG. 1 shows a roughly schematic diagram of a blow moulding station 2. This blow moulding station 2 comprises here a blow mould carrier which is denoted in its entirety by 4. This blow mould carrier comprises two carrier halves 22 and 24 which hold the blow mould in the working mode. More specifically, the blow mould 6 is likewise composed of two blow mould parts or blow mould halves 12 and 14, wherein the first blow mould half 12 is attached to a first carrier half 22 and a second blow mould half 14 is attached to a second carrier half 24. However, a corresponding attachment mechanism is not shown in FIG. 1.

Furthermore, the blow mould 6 also comprises a bottom part 16 which together with the two blow mould parts 12 and 14 forms a cavity 15, inside which the plastic preforms (not shown) are expanded to form the containers. Reference 36 denotes a forward movement element which moves the bottom part 16 towards the two side parts 12 and 14 of the blow mould in a working mode.

Reference 20 shows in a roughly schematic manner an attachment device which attaches the two blow mould halves to one another in order to remove the blow mould in a closed state. Said attachment device may comprise for example oppositely polarised magnets which hold the two blow mould halves against one another. In order to prevent the blow mould halves from being held together also in the working mode, various possibilities are conceivable. For example, one of the two magnets could be displaceable relative to the other in a longitudinal direction L of the blow mould, so that no magnetic force exists between the two blow mould parts 12 and 14 in the working mode. Furthermore, it would also be possible that one or both magnets is displaced respectively inwards in the radial direction R of the blow mould, so that likewise a magnetic force between the two blow mould parts 12 and 14 is minimised or reduced to zero in the working mode.

The attachment device is therefore composed here of at least two magnets 31, 32, wherein the magnet 31 is arranged on the first blow mould half 12 and the other magnet is arranged on the second blow mould half 14. The two blow mould halves could thus have recesses in which the two magnets 31, 32 are arranged. It would also be possible to provide just one magnet which attracts a magnetic portion of the respective other blow mould half. The magnets could also be displaceable in a longitudinal direction L of the blow mould in order to release or form the magnetic hold.

However, other (in particular mechanical) holding elements which hold the two blow mould parts 12, 14 together may also be conceivable in addition, such as for example mechanical retaining bolts or the like, by means of which the two blow mould halves can be coupled together as desired. Such locking elements could also be controlled automatically, for example via a guide cam.

As mentioned, in a deinstallation mode, the blow mould carrier 4 is first detached from the blow mould 6 and then the blow mould in its entirety can be removed from the machine.

However, a removal in the longitudinal direction, i.e. perpendicular to the plane of the figure, would also be possible.

Furthermore, it would also be possible to couple a locking mechanism, which attaches the two blow mould halves 12 and 14 to the respective carrier halves 22 and 24, to a locking mechanism of the two blow mould halves 12 and 14. This coupling could be such that, in the event of an unlocking of the blow mould halves 12 and 14 relative to the carrier halves 22 and 24, a locking of the two blow mould halves 12 and 14 occurs at the same time.

Figure 2A:
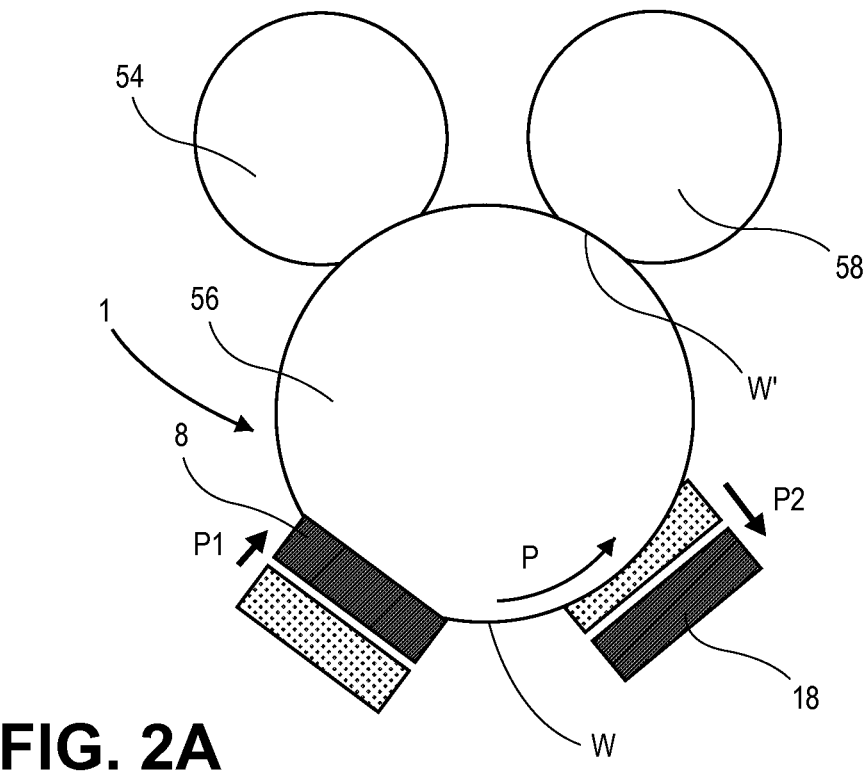
FIGS. 2a-2b show two diagrams to illustrate the installation and deinstallation of the blow mould.
Figure 2B:
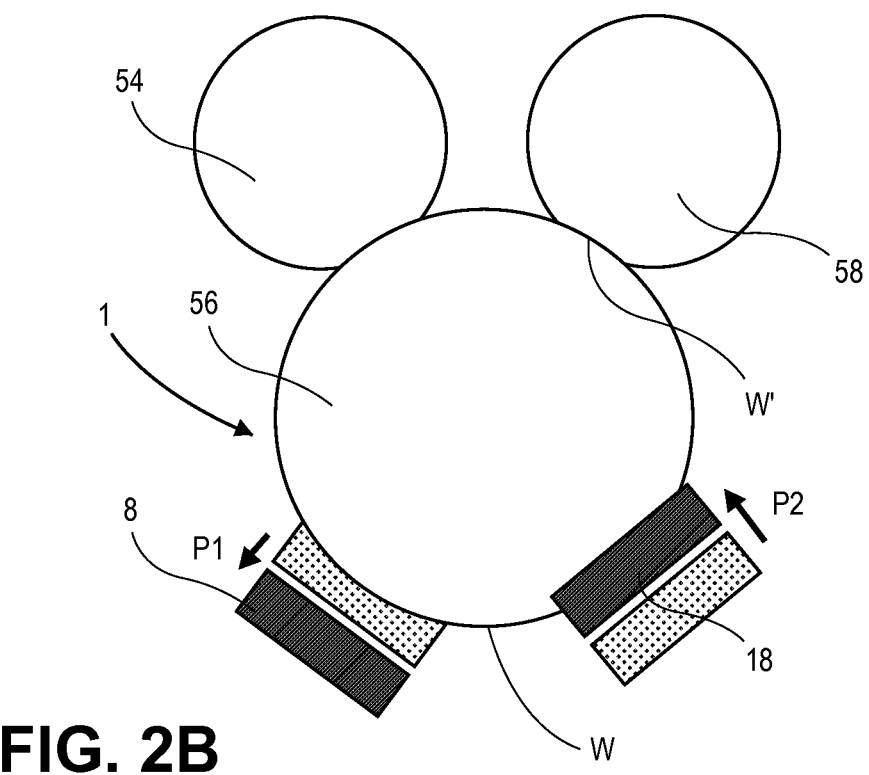

FIGS. 2a and 2b respectively illustrate a deinstallation and installation process for a blow mould. Here, reference 54 denotes an inlet starwheel, via which plastic preforms are fed to the transforming device 1 in a normal working mode. These plastic preforms are respectively expanded to form plastic containers in a plurality of transforming devices which are arranged on a blow moulding wheel 56. Reference 58 denotes an outlet starwheel for transporting away the finished, blow-moulded plastic containers. Reference P denotes the rotation of the blow moulding wheel 56.

Reference 8 denotes a first guide device. This first guide device 8 can be moved towards the blow moulding wheel 56 in the direction of the arrow P1. The first guide device 8 serves for detaching or separating the blow mould from the blow mould carrier. It is possible that, in a deinstallation mode, the blow moulding wheel 56 with the blow moulding stations or transforming devices arranged thereon is rotated and thus the individual transforming devices, i.e. in particular also the blow mould carriers thereof, are moved past the guide device. In some aspects, the blow moulding wheel is rotated much more slowly in this case than in a working mode, and with particular preference a continuous movement also takes place here. However, a movement would also be conceivable.

By virtue of the blow mould carriers moving past the first guide device 8, the mechanical connection between the blow mould carriers and the blow moulds is detached. In addition, the first guide device 8 shown in FIG. 2a can also be used to separate a flow connection which supplies the blow mould with a temperature control medium such as (cooling) water for example.

Reference 18 denotes a second guide device which serves here for establishing a holding connection between the blow mould carrier and the blow mould and for fixing the blow mould to the blow mould carrier. Here too, the blow mould carriers are moved past this guide device 18 and thus a connection is established, for example by the use of guide rollers. This installation mode is shown in FIG. 2b, in which the second guide device 18 (arrow P2) is moved towards the blow moulding wheel 56 and the first guide device is moved away from the blow moulding wheel 56 (arrow P1).

The device may also comprise checking means which ensure that in a normal working mode none of the two guide devices 8, 18 is moved towards the blow moulding wheel 56. In addition, sensors or checking means may be present which check the holding, possibly mechanical, connection between the blow mould and the blow mould carrier. Further checking means may also check whether a leaktight flow connection has been established between the channel(s) in the blow mould and the connector(s).

Reference W denotes a possible point or region in which the blow mould can be manually removed from the system. Reference W' denotes a point or region in which the blow mould can be automatically removed from the system, i.e. in this case via the outlet starwheel 58.

For the removal of the blow mould or of the changeable parts of the mould, therefore, the device and the handling may be designed in such a way as to make savings with regard to the changeover time. This time saving results mainly from the joint removal or insertion of the blow mould, i.e. of the two mould halves 12 and 14 and of the bottom mould 16, so that just one process is required instead of three different processes as in the prior art.

Figure 3A:
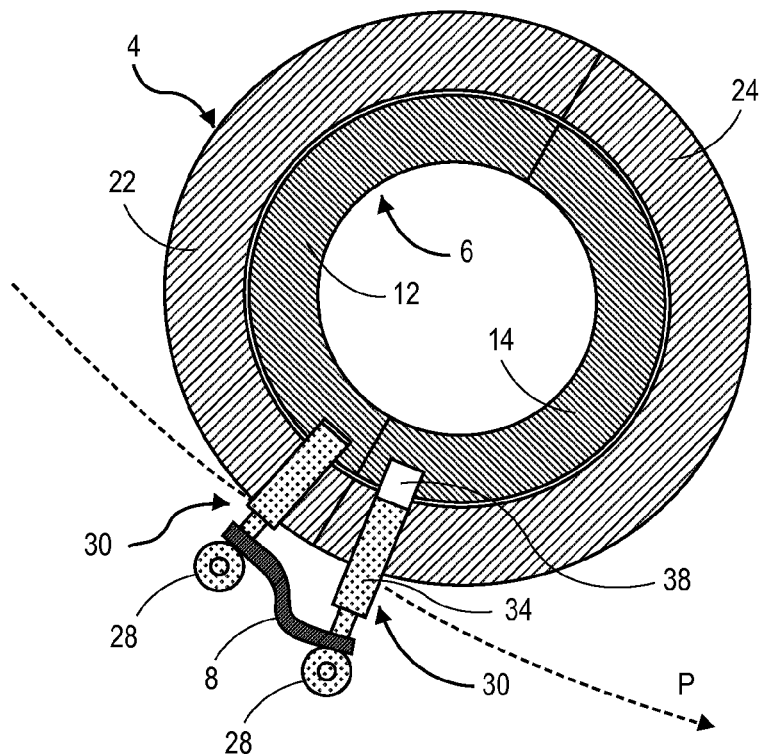
FIGS. 3a-3b show two diagrams to illustrate the installation and deinstallation of the blow mould.

FIG. 3a shows a further view to illustrate a mode of deinstalling a blow mould. Here, the blow mould carrier 4 with the blow mould 6 inserted therein is transported along the path P, which also corresponds to the path in the normal working mode, and in doing so a connecting bolt 34 which is connected to a guide roller 28 is moved past the first guide device 8. This movement causes the connecting bolt 34 to be pulled out of a corresponding recess 38 which is arranged here in an outer wall of the blow mould 6. Reference 30 denotes the holding connection in its entirety.

In this way, the blow mould 6 is detached from the blow mould carrier 4. In some aspects, the blow mould is in the assembled state during this process, i.e. in particular the two side parts 12, 14 of the blow mould 6 are connected to one another. Once the blow mould has been detached or separated from the blow mould carrier, the blow mould carrier can be opened and then the blow mould 6 can be removed. In order to open the blow mould carrier, use may be made of the same means or guide cams which also serve to open the blow mould carrier in the working mode.

Figure 3B:
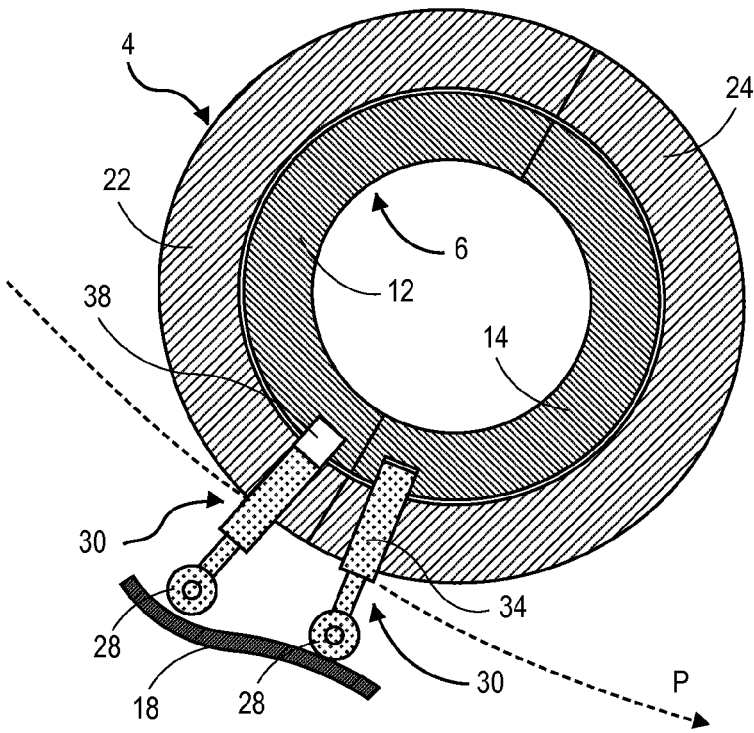

FIG. 3b shows a corresponding installation process. Here too, the individual blow mould carriers are moved past the second guide device 18, wherein, as a result of this movement, the connecting bolt 34 is pushed into the recess 38 in order thus to establish the holding connection 30 between the blow mould and the blow mould carrier 4. More specifically, the blow mould may also in this case first be positioned in the assembled state relative to the blow mould carrier, then the blow mould carrier 4 can be closed around the blow mould 6 and finally the mechanical connection between the blow mould carrier 4 and the blow mould 6 can be closed. Further (likewise automatically detachable) engagement means (not shown) may be present between the blow mould 6 and the blow mould carrier in order to hold the blow mould 6 on the blow mould carrier 4.

Figure 4:
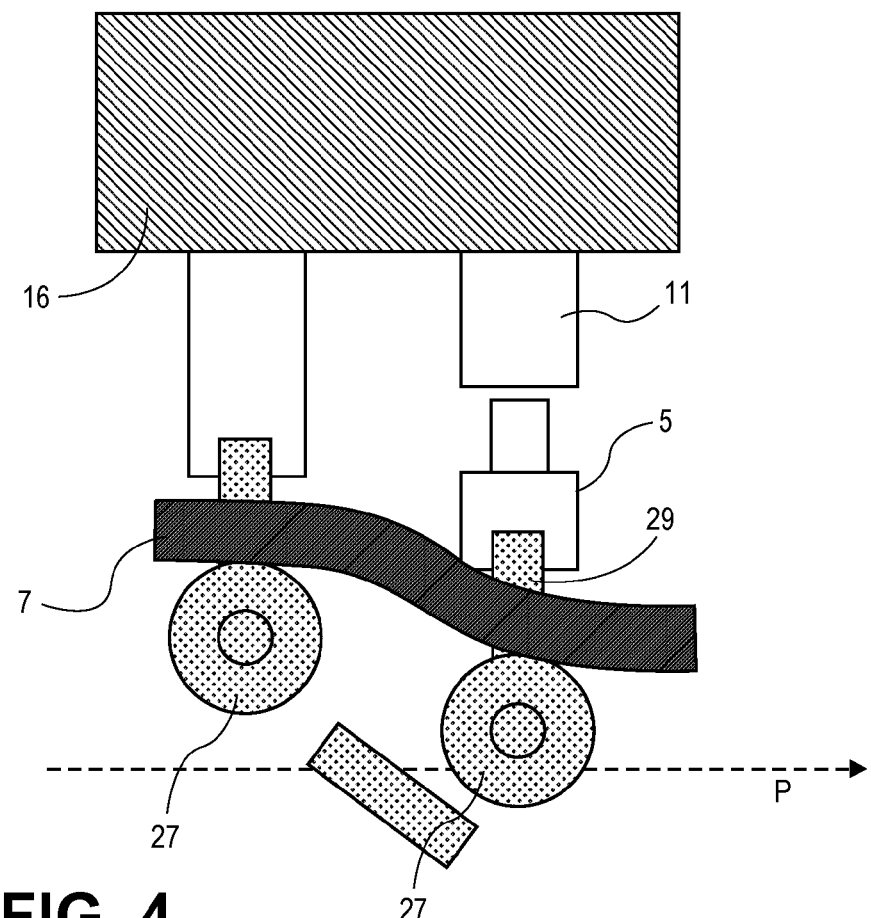
FIG. 4 shows a diagram to illustrate the separation of the flow connection.

FIG. 4 shows a further diagram to illustrate the separation of the connection for one or more temperature control media. Here, a connector 5 is provided which is introduced into a corresponding (rapid-action) coupling 11 arranged in a bottom part 16 of the blow mould in order to establish the flow connection so as to supply the temperature control medium to the channel in the blow mould. As the bottom part 16 is moved along the path P, a guide cam 7, which can likewise advantageously be moved forwards here, brings about the situation whereby the connector 5 is pulled out of the coupling 11 and thus the flow connection for the temperature control medium is separated. There may be provided in the connector 5 a valve which closes at the time of this separation in order thus to prevent the remainder of the temperature control medium from being able to run out of the connector 5. In this way, a temperature control medium connector, such as in particular a water connector for the blow mould 6, can be detached.

Figure 5:
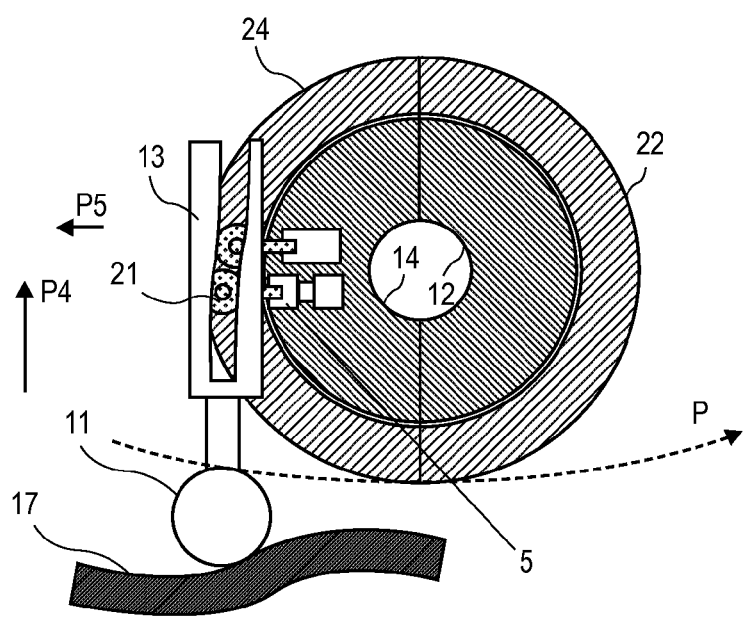
FIG. 5 shows a further diagram to illustrate the separation of the flow connection.

FIG. 5 shows a further diagram to illustrate an establishment or detachment of a flow connection for a temperature control medium for a neck region of the blow mould. A guide cam 17 is likewise provided here which, as the blow mould is moved in the direction of the arrow P, brings about a movement of a guide roller 11 and of an actuator 13 arranged thereon in the direction P4. This movement in turn leads to a movement of further guide rollers 21 in the direction of the arrow P5 and thus to a movement of the connector piece 5 arranged thereon. In this way, a flow connection for a neck cooling of the container can be established or separated.

Finally, it is pointed out that, in the context of this description, the term blow mould carrier means the surrounding element 4 and the term blow mould means the element 6 held by this surrounding element 4. However, it is also possible and known to refer to the element denoted 6 in the context of the description as the mould carrier, since this may also hold a mother mould, against the inner wall of which the container is expanded. Accordingly, the element 4 can also be referred to as the blow mould.

It will be apparent to those skilled in the art that various modifications and variations can be made to the method and device for installing and/or deinstalling blow moulds of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Method for operating a transforming device for transforming plastic preforms into plastic containers, wherein the transforming device comprises at least one blow mould carrier and a multi-part blow mould arranged on the blow mould carrier, the method comprising:
   providing a holding connection between the blow mould and the blow mould carrier; and
   detaching or establishing, in an at least partially automated manner, at least one of
      the holding connection between the blow mould carrier and the blow mould, and
      a temperature control connection for controlling the temperature of the blow mould,
   as the blow mould carrier is moved along a path.

2. Method according to claim 1, wherein the blow mould has at least one channel for guiding a temperature control medium for the blow mould, and also at least one connector which is separable from the channel and which is provided for supplying the temperature control medium to the channel, the method further comprising detaching or establishing a flow connection between the connector and the channel in an at least partially automated manner.

3. Method according to claim 1, wherein the separation or establishment of the holding connection between the blow mould carrier and the blow mould or the separation or establishment of the flow connection between the connector and the channel is brought about by a movement of the blow mould carrier.

4. Method for operating a transforming device for transforming plastic preforms into plastic containers, wherein the transforming device comprises at least one blow mould carrier and a multi-part blow mould arranged on the blow mould carrier, the method comprising:
   providing a holding connection between the blow mould and the blow mould carrier; and
   detaching or establishing, in an at least partially automated manner, at least one of
      the holding connection between the blow mould carrier and the blow mould, and
      a temperature control connection for controlling the temperature of the blow mould,
   wherein said detaching or establishing is brought about by a continuous movement of the blow mould carrier.

5. Method according to claim 2, wherein the separation or establishment of the holding connection between the blow mould carrier and the blow mould and the separation or establishment of the flow connection between the connector and the channel are brought about in a common operating process.

6. Method according to claim 2, wherein a first guide device is used at least to separate or to establish the holding connection or the flow connection between the channel and the connector.

7. Method according to claim 2, wherein the guide device is moved in order to separate the holding connection or in order to separate the connector from the channel.

8. Method according to claim 1, wherein the blow mould comprises a bottom part, the method further comprising connecting or separating at least one connector for a temperature control medium to the bottom part in an automated manner.

9. Transforming device for transforming plastic preforms into plastic containers, comprising:
   a multi-part blow mould which forms a cavity, inside which plastic preforms can be expanded to form plastic containers;
   a blow mould carrier on which the blow mould is detachably arranged via a holding connection;
   at least one coupling device for detaching or establishing at least one of
      the holding connection between the blow mould carrier and the blow mould, and
      a temperature control connection for controlling the temperature of the blow mould,
   as the blow mould carrier is moved along a path.

10. Transforming device according to claim 9, wherein the blow mould has at least one channel for guiding a temperature control medium, and the transforming device has at least one connector which can be separated from the channel and which is provided for supplying the temperature control medium to the channel, the transforming device further comprising at least one coupling device for at least partially separating or establishing a flow connection between the connector and the channel.

11. Transforming device according to claim 10, wherein the coupling device comprises at least a first guide device, relative to which the blow mould carrier is movably arranged.

12. Transforming device according to claim 11, wherein the first guide device is movable.

13. Transforming device according to claim 10, wherein the coupling device comprises a second guide device, relative to which the blow mould carrier is movably arranged.

14. Transforming device according to claim 11, wherein the first guide device serves for at least one of
   at least partially separating the holding connection between the blow mould carrier and the blow mould, and
   at least partially separating a flow connection between the connector and the channel, and
wherein the second guide device serves for at least one of
   at least partially establishing the holding connection between the blow mould carrier and the blow mould, and
   at least partially establishing the flow connection between the connector and the channel.

15. Transforming device according to claim 9, wherein a holding means is provided between the blow mould and the blow mould carrier, said holding means being structured and arranged to hold the blow mould on the blow mould carrier in a working mode, the holding means being movable in a radial direction of the blow mould.

16. Transforming device according to claim 10, wherein the connector is movable in a longitudinal direction of the blow mould.

17. Transforming device according to claim 11, wherein the movement of the blow mould carrier is a continuous movement.

18. Transforming device according to claim 10, wherein said at least one coupling is configured such that the separation or establishment of the holding connection between the blow mould carrier and the blow mould and the separation or establishment of the flow connection between the connector and the channel are brought about in a common operating process.

19. Transforming device according to claim 11, wherein the first guide device is moved in order to separate the holding connection or in order to separate the connector from the channel.

20. Transforming device according to claim 10, wherein the blow mould comprises a bottom part, the at least one connector being configured to be separated and connected to the bottom part in an automated manner.

\* \* \* \* \*